Oct. 22, 1940.   J. V. O. PALM ET AL   2,219,054

BEARING

Filed Nov. 22, 1938

INVENTORS
John V. O. Palm.
BY John K. Anthony and
John E. Wilkey
Fay, Oberlin + Fay ATTORNEYS Patented Oct. 22, 1940

2,219,054

UNITED STATES PATENT OFFICE

2,219,054
BEARING

John V. O. Palm, Cleveland Heights, John K. Anthony, Cleveland, and John E. Wilkey, South Euclid, Ohio, assignors to The Cleveland Graphite Bronze Company, Cleveland, Ohio, a corporation of Ohio Application November 22, 1938, Serial No. 241,790

14 Claims. (Cl. 308—238)

The present invention, relating as indicated to bearings, is more particularly directed to a new and improved bearing having materially increased resistance to fatigue, a higher load capacity than existing bearings and a longer life under equivalent conditions.

To the accomplishment of the foregoing and related ends, said invention, then, consists of the means hereinafter fully described and particularly pointed out in the claims; the annexed drawing and the following description setting forth in detail certain structure embodying the invention, such disclosed structure constituting, however, but one of various means in which the principle of the invention may be used.

The present invention provides a bearing which will withstand not only heavy unit loads, but also shock loads. In general the materials which have been used for bearing purposes, such for example as babbitts, lead bronzes and other metals, will withstand bearing loads of between 1000 and 2000 pounds per square inch of projected area. Numerous attempts have been made to employ phenol resins for bearing uses and under service which produces a steady and continuous pressure against the bearing surface, resins have been found to be quite satisfactory. They are not satisfactory where there are repeated shock loads, however. The bearing now to be described represents a resin bearing which retains the particular advantages of resin combined with elements which serve to produce a high resistance to continuous shock load in the bearing while retaining the resistance of certain artificial resins to chemical action and their ability to withstand the high bearing pressures without deformation.

A further object of the present invention is the provision of a composite resin bearing having the characteristic which is not inherent in resin proper, of repelling the flow of heat produced from the friction in the bearing surface back into the lubricant.

In general the characteristics of resins as generally made and used which distinguish it from the bearing metals and which have prevented it from being generally used as a bearing material are its coefficient of expansion, which is approximately four times that of ordinary bearing metals, its capacity of softening under elevated temperatures and its inability to withstand repeated shock loads. Furthermore, it has insufficient strength in itself to serve as a satisfactory bearing under heavy service and must be bonded or secured to a stronger reinforcing material, such as steel. In addition to these characteristics, resin is less ductile than bearing metals, but when minutely deformed it has practically no fatigue limit and does not break where metal fatigues and then breaks.

Briefly stated, our improved bearing consists of a layer or coating of a polymerized resin provided with a non-metallic heat resistant reinforcing to increase the strength of the coating, in which is incorporated materials having an extremely low coefficient of conductivity and a heat repellant effect, this coating being adhesively secured and mechanically held against a relatively thin reinforcing backing of steel or similar material.

Figure 1:
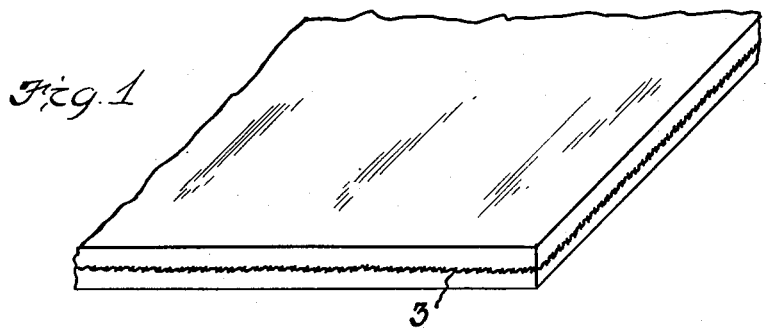
Fig. 1 is a view in perspective of one form of our improved invention.
Figure 2:
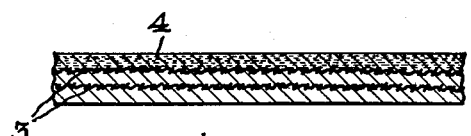
Fig. 2 is a similar view showing a modification of the bearing of Fig. 1.
Figure 3:
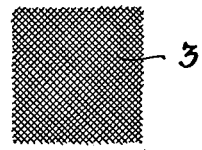
Fig. 3 is a plan view of a piece of reinforcing material employed in our improved bearing.

Referring now to the drawing, we have shown in Figs. 1 and 2 a flat sheet of our improved bearing material which may of course be used either in the form of flat sheets or of round or half round elements, depending upon the service. In the manufacture of our bearing for use as a half-round bearing element, we first take a semi-cylindrical sheet or strip of steel or similar material 1 provided with a serrated inner surface 2, against which the bearing coating is to be applied and bonded. In the further manufacture of the bearing a coating of resin is first applied against the serrated surface 2 of the strip, after which a layer 3 of relatively coarse porous heat resistant fabric, such as woven glass cloth, is applied and over this is laid a second layer of resin. In the upper layer of the resin there may or may not be incorporated a small amount of graphite, i. e., approximately 5% by volume, and, by volume, a relatively large amount of a heat repellant material such as a mica, in finely divided form, particles somewhat coarser than 200 mesh having proven satisfactory, the particles of which are shown in Fig. 2 in planes substantially parallel to the surface of the bearing. The entire coating is then molded under heat and pressure sufficient to polymerize the resin and form a unitary reinforced resin coating on the backing, the resin being bonded mechanically into the serrations in the backing strip and having also a considerable degree of adhesion thereto. For some purposes we find it desirable to employ two spaced layers 3 of the reinforcing glass cloth, as shown in Fig. 2 of the drawing, and it is highly desirable that the cloth be of the character illustrated in Fig. 3, that is, of fairly coarse open weave, permitting the resin when molded to pass through the interstices of the fabric and completely surround and embed the fabric in the resin.

A resin which we have found satisfactory is a resinoidal formaldehyde which is heated and hardened. When formed, this resin is of substantially constant hardness at temperatures between −60° F. and 500° F. and has approximately the same strength at 400° F. as at 70° F., which includes the usual range of temperatures to which the material is subjected in varying service. The working range of temperatures in bearings is from as low as 100° F. under exceptional conditions up to possibly 550° F. as a maximum. It is polymerized, that is, the resin is sufficiently completely reactive when molded so that no objectionable change occurs thereafter in the bearing. In the manufacture of our bearing the resin is held briefly at the molded temperature in order to relieve strains existing in the material and to perform an operation which, if the material were metal, would be called annealing or normalizing. This prevents cracking of the material after forming.

The reinforcing material is, as stated above, a loosely woven heat-resistant fabric, loosely woven glass cloth having proved satisfactory. This material is flexible, that is, as flexible as fabrics such as canvas or the like, is highly resistant to any temperature normally produced in the bearing and is inactive to the resin or the lubricating oils employed with the bearing. It greatly improves the strength of the resin, bringing it up to a point where the new bearing has greater strength than ordinary bearing materials, such as babbitt, lead bronze and the like, especially at elevated temperatures.

The mica, which is very finely divided and which is in the form of flat particles incorporated in the mixture by rolling, appears to have a very peculiar and advantageous action. The particles are flexible, flat and glazed and appear to have the property of repelling heat which otherwise would be conducted into the bearing material. Molybdenum sulphide, which has low conductivity and low friction, will also reinforce the material, as will also graphite, although composite resin, which incorporates molybdenum sulphide or graphite, alone, is usually less strong than when made with mica. The mica can be used in varying amounts, but in general, not less than about 15% by volume of the composite resin should be employed, the amount ranging up to 45% by volume. Muscovite mica has been found suitable for use in our new bearing. The mica should be used in finely ground condition, that is, in particles which are flaky and which are thin as practicable.

The conductivity of our improved bearing is extremely low. For example, the relative thermal conductivities of the ingredients of the bearing are as follows:

Mica _____ 5.2
Graphite _____ 107
Glass approximately _____ 50
Resin approximately _____ 1.0–2.0

These conductivities compare with those of tin 499, aluminum 1392, brass 754, silver 2919, all of which are materials frequently used in metallic bearing compositions, and from this it will be seen that the heat conductivity of our mixture is extremely low (Kent's Hand Book).

The introduction of mica into the resin converts the latter from an inferior bearing material, having a strength which is too low for many purposes, into a good bearing material, whether or not graphite is mixed with the mica and the resin. In the manufacture of the bearings the mica is introduced into the upper layer of the bearing. While we do not know exactly why the mica converts the resin from a poor to a good bearing material, it is believed that this is due to (1) the heat insulating qualities of the mica, (2) the anti-friction qualities of the mica, (3) the reinforcement of the resin and the increased strength thus secured and (4) the flexibility imparted to the entire mixture, and in the manufacture of bearings the combined resin and mica are compressed and set in dies which permit of slight extrusion of the resin circumferentially or axially of the curved bearing surface if the bearing is cylindrical, or transversely or longitudinally of the bearing surface if the latter is flat, in order to allow for movement of the particles of mica and the orientation of these particles in the upper layer of the bearing into a position in which most of the particles lie in planes parallel or concentric with the surface of the bearing.

Figure 4:
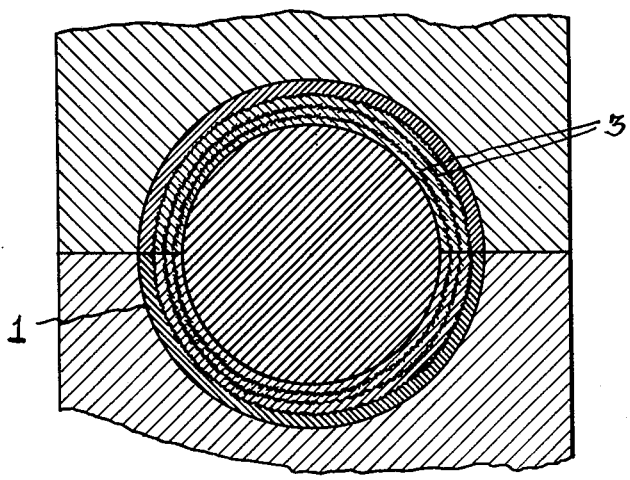
Fig. 4 is a transverse central section through a complete cylindrical bearing and shaft journaled therein.
Figure 5:
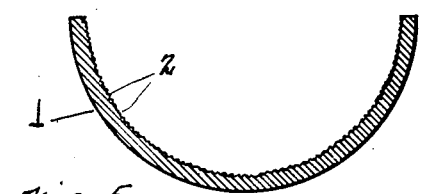
Fig. 5 is a partial transverse section of the prepared shell against which our improved bearing material is bonded.

Tests have been conducted of our improved bearing in the form of semi-cylindrical shells, such as are shown in Fig. 4, and it has been found that bearings representing one embodiment of our invention, loaded with a mean unit pressure of 3000 pounds per square inch can be run at a speed of 4000 R. P. M. substantially indefinitely, provided that the oil-film employed is strong enough to prevent breakdown in the film. The wear of the material in such a test is roughly one-fifth of that of copper lead bearings.

A soft steel shaft when tested with our bearing showed wear of one ten-thousandth of an inch in 350 hours, which is very little as compared with copper lead bearings tested under the same conditions. At 2000 pounds pressure and 4000 R. P. M. copper lead bearings will almost always fail at between 150 and 200 hours. Our new bearing, therefore, makes a distinct and significant advance as compared with the best and strongest metallic bearing materials now generally used for heavy duty.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. A bearing comprising an element consisting of a resinoid having a strip composed of glass fibres embedded therein in position to reinforce the same against mechanical strains, and having also a heat repellant material other than glass embedded in that portion of the bearing adjacent the bearing surface.

2. A bearing comprising an element consisting of a resinoid having a strip composed of glass fibres embedded therein in position to reinforce the same against mechanical strains, and having finely divided mica embedded in that portion of the bearing adjacent to the bearing surface.

3. A bearing comprising an element consisting of a resinoid having a strip composed of glass fibres embedded therein in position to reinforce the same against mechanical strains and having a multiplicity of small flat particles of a heat repellant material embedded in that portion of the bearing adjacent the bearing surface, said particles lying substantially parallel to the bearing surface.

4. A bearing comprising an element consisting of a resinoid having a strip composed of glass fibres embedded therein in position to reinforce the same against mechanical strains, and having also a heat repellant material other than glass embedded in said bearing, said material being confined to that portion of the bearing which is adjacent the bearing surface.

5. A bearing comprising an element consisting of a resinoid having reinforcing embedded therein, said reinforcing consisting of loosely woven glass cloth, and having finely divided mica embedded therein, said mica being confined to that portion of the bearing between said glass cloth and the operating surface of the bearing.

6. A bearing comprising an element consisting of a resinoid having reinforcing embedded therein, said reinforcing comprising fibres of glass arranged in a plane substantially parallel with the operating surface of the bearing, and having also a heat repellant material different from said fibres embedded in said bearing, said heat-repellant material being confined to that portion of the bearing between said reinforcing and said operating surface.

7. A bearing comprising an element consisting of a resinoid having reinforcing embedded therein, said reinforcing comprising woven glass cloth arranged in a plane substantially parallel with the operating surface of the bearing, and having finely divided mica embedded therein, said mica being confined to that portion of the bearing between said glass cloth and said operating surface.

8. A bearing comprising a relatively thin steel backing shell of semi-cylindrical form having bonded thereto a coating of a resinoid having embedded therein a reinforcing layer of woven glass cloth, and a layer of a heat-repellant material, said heat-repellant material being confined to that portion of the resinoid between said glass cloth and the operating surface of the bearing.

9. A bearing comprising an element consisting of a resinoid having a strip composed of glass fibres embedded therein in position to reinforce the same against mechanical strains, and having finely divided mica and finely divided graphite embedded therein in that portion of the bearing adjacent the bearing surface, said mica constituting about 45% by volume of the bearing and said graphite constituting about 5% by volume of the bearing.

10. A bearing comprising an element consisting of a resinoid having a strip composed of glass fibres embedded therein in position to reinforce the same against mechanical strains, and having finely divided mica embedded therein, said mica being confined to that portion of the bearing between said strip and the operating surface of the bearing, and constituting about 45% by volume of the bearing.

11. A bearing comprising an element consisting of a resinoid having reinforcing embedded therein in position to reinforce the same against mechanical strains, said reinforcing being substantially continuous throughout the area of the bearing and composed of glass fibres, and having also a heat repellant material other than glass embedded in that portion of the bearing adjacent the bearing surface.

12. A bearing comprising an element consisting of a resinoid having reinforcing embedded therein in a position to reinforce the same against mechanical strain, said reinforcing being substantially continuous throughout the area of the bearing and composed of glass fibres arranged in a plane substantially parallel with the operating surface of the bearing, and having also a heat repellant material other than glass embedded in that portion of the bearing adjacent said operating surface of the bearing.

13. A bearing comprising an element consisting of a resinoid having reinforcing embedded therein in position to reinforce the same against mechanical strains, said reinforcing being substantially continuous throughout the area of the bearing and composed of glass fibres, and having also finely divided mica embedded in that portion of the bearing adjacent the bearing surface.

14. A bearing comprising an element consisting of a resinoid having reinforcing embedded therein in a position to reinforce the same against mechanical strain, said reinforcing being substantially continuous throughout the area of the bearing and composed of glass fibres arranged in a plane substantially parallel with the operating surface of the bearing, and having also finely divided mica embedded in that portion of the bearing adjacent said operating surface of the bearing.

JOHN V. O. PALM.
JOHN K. ANTHONY.
JOHN E. WILKEY.